United States Patent [19]

Henry et al.

[11] 4,235,618
[45] Nov. 25, 1980

[54] GLASS MANUFACTURING PROCESS EMPLOYING GLASS BATCH PELLETS

[75] Inventors: Richard K. Henry, Newark; Stephen Seng, Frazeysburg; Charles M. Hohman, Granville; Mark A. Propster, Gahanna, all of Ohio

[73] Assignee: Owens-Corning Fiberglas Corporation, Toledo, Ohio

[21] Appl. No.: 31,290

[22] Filed: Apr. 19, 1979

[51] Int. Cl.³ ............................................ C03B 1/00
[52] U.S. Cl. .......................................... 65/21; 65/27
[58] Field of Search ................................... 65/21, 27

[56] References Cited

U.S. PATENT DOCUMENTS

| | | | |
|---|---|---|---|
| 3,542,534 | 11/1970 | Yamamoto | 65/27 |
| 4,081,259 | 3/1978 | Bassin et al. | 65/21 |

OTHER PUBLICATIONS

"Disc", Bulletin No. 69EQP02A by Dravō Corporation of Pittsburgh, Pa., Oct. 1972.
Muller, "Advantages of Industrial Pelletizing of Glass Batch," *Glastechnische Berichte* 50 (1): 19–23, (1977).

Primary Examiner—Richard V. Fisher
Attorney, Agent, or Firm—Ronald C. Hudgens; Robert F. Rywalski

[57] ABSTRACT

A process is described for minimizing the sticky or tacky surface characteristics of free water-containing glass batch pellets so as to allow for the more expeditious handling of such pellets in further processing operations. Generally, this is effected by coating the pellets subsequent to their formation on a rotating disc pelletizer, the coating being done with a tumbling motion in a rotary drum member so as to form a substantially uniform surface coating on the pellets. The coating material is the same glass batch composition employed to produce the pellets.

7 Claims, 1 Drawing Figure

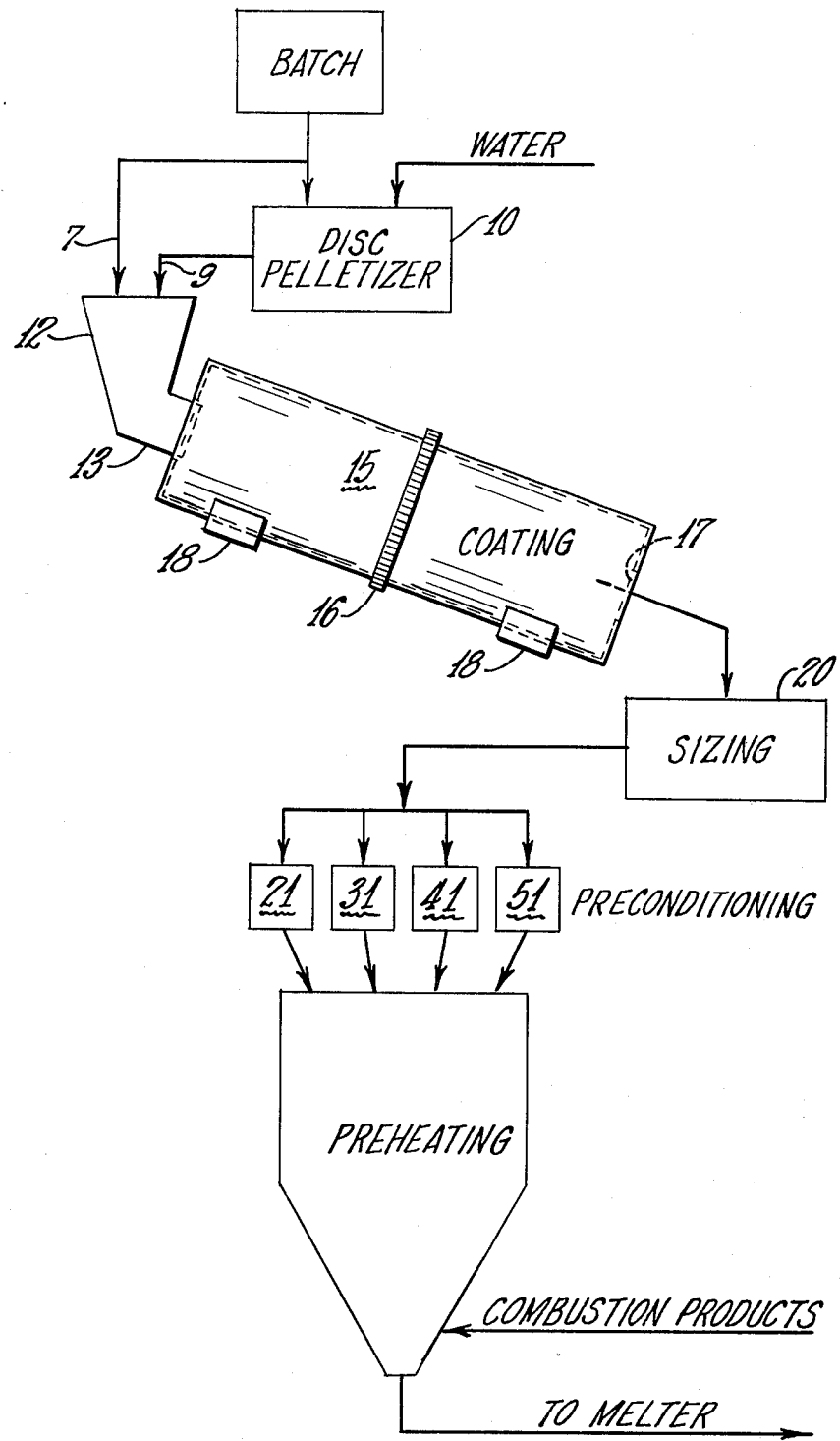

GLASS MANUFACTURING PROCESS EMPLOYING GLASS BATCH PELLETS

TECHNICAL FIELD

The present invention relates to the art of glass manufacturing and, more specifically, the present invention relates to the art of glass manufacturing wherein free water-containing, glass-forming, batch pellets are formed and then preheated to an elevated temperature for subsequent vitrification in a glass melter.

BACKGROUND AND SUMMARY OF THE INVENTION

In co-pending application U.S. Ser. No. 031,368 and co-pending application U.S. Ser. No. 031,369 both filed on Apr. 19, 1979, both of which are hereby incorporated by reference, processes and apparatus are disclosed for drying and preheating free water-containing, glass batch pellets to an elevated temperature prior to melting. Such processes and apparatus are especially, uniquely adapted to glass manufacturing wherein the pellets are hydrologically unstable; i.e., pellets which, when attempted to be dried and preheated in a single processing operation in a bed, by passing a heating and drying medium therethrough which is wet, or humid, convert into process-disabling aggregates. Such aggregate formation results when using, for example, flue gases emanating in a fossil fuel fired melter which have been passed through a heat exchanger as, for example, a regenerator or a recuperator. Such instability also results when using combustion products having a wet bulb temperature substantially the same as the wet bulb temperature of such flue gases, for example, a wet bulb temperature of between about 130° F. to about 140° F. The aggregate formation problem is solved, in such applications, by forming separate beds of the free water-containing glass batch pellets in a preconditioning chamber and then preconditioning those beds to a hydrologically stabilized state by removing at least some of the water therefrom, after which the beds preferably in a cyclic and sequential manner, are discharged to a main vertical bed where they are then preheated to an elevated temperature. The preheating is accomplished by the use of flue gases from a fossil fuel fired melter or by separately provided gaseous combustion products with the gases, after passage through the vertical bed being used as the heating medium in the preconditioning beds.

It has been observed that after free water-containing glass batch pellets of such compositions have been produced on a rotary disc pelletizer, the surface of such pellets are sticky, or tacky, which complicates the handling of the pellets in conveying them into the preconditioning chamber for preconditioning. This problem is especially acute in instances where the glass batch formulation, on a theoretical dry oxide basis, contains between about 5% to about 20% or 25% by weight or $Na_2O$ and especially when the $Na_2O$ content is between about 10% and about 20% by weight. Such pellets usually contain about 5% to about 20% by weight of free water, with the tackiness being quite acute when the water content is between about 10% to about 20% (dry basis). The present invention solves this problem and satisfies the need in the art by enhancing the ability to confidently and reliably handle such type pellets at the high production speeds needed for a competitive glass manufacturing process.

Thus, in accordance with one feature of this invention, there is provided an improvement in processes for drying and preheating free water-containing hydrologically unstable glass batch pellets which processes comprise combining glass batch ingredients and water on a rotary disc pelletizer so as to form pellets, heating said pellets in a bed so as to form heated dry pellets, conveying such heated dry pellets to a glass melter and melting the heated pellets therein. The improvement comprises coating the surface of said pellets prior to heating by combining said pellets and dry, particulate glass batch ingredients having substantially the same glass forming composition as the batch ingredients used to form the pellets with a tumbling motion in a rotary drum so as to form a substantially uniform surface coating on said pellets. The combining of the free water-containing pellets will be done with a small, effective, tackiness-precluding amount of the dry glass batch ingredients. Outstanding results are achieved when the amount is about 1 to about 5 parts by weight of the dry batch ingredients per about 100 parts by weight of the free water-containing glass batch pellets.

In accordance with another feature of this invention, there is provided an improvement in processes of the type which comprise supplying an admixture of dry particulate glass forming batch ingredients to a rotary disc pelletizer, introducing water to said rotating disc pelletizer and combining the batch ingredients and water thereon into pellets; the improvement comprises conveying pellets after formation on said pelletizer to a rotating tubular drum, diverting a portion of the supplied admixture and conveying said diverted portion to said rotating tubular drum without discontinuing the supply to the pelletizer, maintaining tumbling contact between the pellets and diverted portion in said drum for sufficient period of time to uniformly coat the pellet surfaces with said diverted dry particulate glass batch and discharging coated pellets from the drum. In this way, the surface of the pellets are provided with a coating which effectively partially dehydrates the pellet surface such that the surface has a greatly decreased adhesive character, thereby allowing for more reliable subsequent handling and processing.

DESCRIPTION

Referring to the FIGURE there is exemplified a preferred mode of practicing the present invention. Glass-forming, batch ingredients and water are combined on a rotary disc pelletizer 10 into pellets with the so formed pellets being removed from the pelletizer, then conveyed by a suitable conveyor 9 to a tubular-like, inclined, rotating drum member 15. Generally, it will be preferred to have the rotary disc pelletizer as closely adjacent as reasonably practicable to drum member 15 to minimize the length and time of conveying. The pellets are discharged into a hopper 12 and enter rotary drum member 15 through an inlet, charging ring 13 thereof. A portion of the batch supplied to the disc pelletizer, during pelletization operation, is diverted and likewise conveyed to hopper 12. That is, a portion of the supply of batch ingredients bypass the pelletizer and are conveyed by a suitable conveyor 7 to hopper 12. The pellets and the diverted stream of glass batch, in a tumbling-like motion, are then contacted in rotary drum member 15 so as to form a substantially uniform coating on the pellets. Rotary drum member 15 is rotatably operatively supported on idler members 18 and is rotatingly driven by any suitable means 16 such as, for example, a sprocket and chain drive or appropriate gears. The coated pellets are then discharged through discharge end 17 to a suitable sizing device 20. From sizing device 20 the pellets are then conveyed, and formed into separate preconditioning beds, in preconditioning chambers 21, 31, 41, and 51. After the appropriate preconditioning cycle, the beds are discharged unto a main vertical bed in a preheating chamber for preheating with combustion products. For further particulars with regard to the operation of the preconditioning chambers and preheating chamber, reference may be had to the above-incorporated applications. As indicated therein, the combustion products may, for example, be flue gases from a fossil fuel fired glass melter, which gases have been passed through a heat exchanger, for example, a recuperator or regenerator, prior to being employed for pellet preheating. If desired, as where it is contemplated to melt the preheated pellets in an electrical melter, the combustion products are separately provided by combustion of an appropriate fuel and air mixture. After passage through the vertical bed, the gaseous heating medium is supplied to the preconditioning chamber.

The angle of inclination of rotary drum 15 will, of course, vary with different installations, but outstanding results will be realized with an angle of about 3 degrees to about 6 degrees and preferably about 4 degrees to 5 degrees. Similarly, the average retention time of the pellets in the drum will vary, but suitable times will be on the order of several minutes, for example, one or two minutes to about five or six minutes, with outstanding results being attained with a retention time of about two to four minutes. Preferably, the amount of glass batch which is combined with the previously formed pellets will be about 1 part by weight to about 5 parts by weight of the dry batch ingredients per approximately 100 parts by weight of the free water-containing glass batch pellets and most desirably about 3 parts.

In passing, it should be mentioned that there are suggestions in the prior art to employ a re-roll ring, which is integral with the rotary disk pelletizer, as a way for coating pellets generally. It will be found that the technique of the present invention is quite superior to the use of such a re-roll ring as, for example, in terms of coating uniformity and control.

Outstanding results are attained when employing the present process on such common glasses as the soda lime silicate glasses commonly employed in the manufacture of glass containers and in the plate, or flat glass industries. Typically, the raw materials employed in the batch for such compositions will include sand, a sodium carbonate and/or sodium hydroxide, limestone, clay and burnt dolomite. Desirably, if some of the soda content of the batch is supplied in the form of an aqueous solution of sodium hydroxide, since it is desired that the coating be of substantially the same composition as the pellet batch formulation, it will be preferred that a separate batch be manufactured in which the soda is either totally supplied in the form of a sodium carbonate, for example soda ash, or as a dry caustic, as for example a flake form of caustic. Preferably, however, the entire soda content will be supplied to the batch in the form of a granular type sodium carbonate.

Other compositions to which the present invention is outstandingly adapted are the fiberizable glass compositions generally employed for insulation purposes, namely the soda-lime-aluminoborosilicate glass compositions; e.g., wherein the cumulative total weight percent of silica, aluminum oxide, boron oxide, sodium oxide, and calcium oxide is in excess of about 75% by weight of the theoretical glass composition and more typically in excess of 97% by weight. Typically the raw materials for such soda-lime-aluminoborosilicate compositions will be burnt dolomite, clay, limestone, sand, soda ash and/or sodium hydroxide with the preferred $B_2O_3$ sources preferably being calcium borates and/or sodium calcium borates.

In general, as recognized in the art, the particle size of the material employed for pelletization will vary with different batches, but generally the size is quite small. Usually it will be preferred that the particle size of the particulate batch employed, when measured by a Micro Trac particle size analyzer, be such that about 100% of the particles are smaller than 300 microns. Outstanding results are attained when the average particle size of the batch used for pelletization is between about 110 to about 120 microns.

More specifically exemplary of a composition which is outstandingly adapted for use in the present invention, is a soda-lime-aluminoborosilicate glass containing about 55% to about 65% by weight silica, about 3% to about 6.5% by weight alumina, about 6% to about 10% by weight of calcium oxide, about 11% to about 16.5% by weight of $Na_2O$, and about 3% to about 12% by weight of $B_2O_3$. Such compositions may also typically include about 0% to about 3% by weight of $K_2O$, 0% to about 0.5% by weight $Fe_2O_3$, and up to about 0.5% by weight $TiO_2$, up to 3% by weight BaO, up to about 0.2% by weight $Li_2O$, up to about 0.5% by weight SrO and up to about 4.5% by weight MgO. Pellets for such a glass formulation having about 12–14% by weight of free water when coated with about 3 parts by weight of batch formulation per about 100 parts by weight of the free water-containing pellets exhibited a dry appearing surface. Such pellets handled quite easily compared to uncoated pellets.

Having described our invention, it will, of course, be apparent that modifications are possible which pursuant to the patent statutes and laws do not depart from the spirit and scope thereof.

We claim:

1. In a process for drying and preheating free water-containing, hydrologically unstable glass batch pellets comprising combining glass batch ingredients and water on a rotary disc pelletizer so as to form pellets, heating said pellets in a bed so as to form heated dry pellets and melting said pellets, the improvement comprising coating the surface of said pellets, prior to heating, by combining said pellets and dry glass batch ingredients having substantially the same glass composition as the batch ingredients used to form said pellets with a tumbling motion in a rotary drum so as to form a substantially uniform surface coating on said pellets.

2. The improvement of claim 1 wherein said combining is in an amount of about 1 to about 5 parts by weight of said batch ingredients per 100 parts by weight of said pellets.

3. The improvement of claim 2 wherein said glass batch contains 10% to 20% by weight $Na_2O$ and said $Na_2O$ is substantially totally supplied by a sodium carbonate.

4. In a process comprising supplying an admixture of dry particulate glass forming batch ingredients to a rotating disc pelletizer, introducing water to said rotating disc pelletizer and combining said batch ingredients and water thereon into pellets, the improvement comprising conveying pellets from said pelletizer to a rotating inclined tubular drum, diverting a portion of said supplied admixture and conveying said diverted portion to said rotating tubular drum without discontinuing the supply to said pelletizer, maintaining tumbling contact between said pellets and diverted portion in said drum for a sufficient period of time to uniformly surface coat the pellets with said diverted dry particulate glass batch and discharging said coated pellets from said drum.

5. The process of claim 4 wherein said glass batch ingredients contain about 10% to about 20% by weight of $Na_2O$ on a theoretical oxide basis.

6. The process of claim 5 wherein said batch is diverted in an amount sufficient to coat said pellets in the range of about 1 to about 5 parts by weight per about 100 parts by weight of pellets.

7. The process of claim 6 wherein said drum is inclined with respect to the horizontal at an angle of about 3° to about 6°.

* * * * *